UNITED STATES PATENT OFFICE.

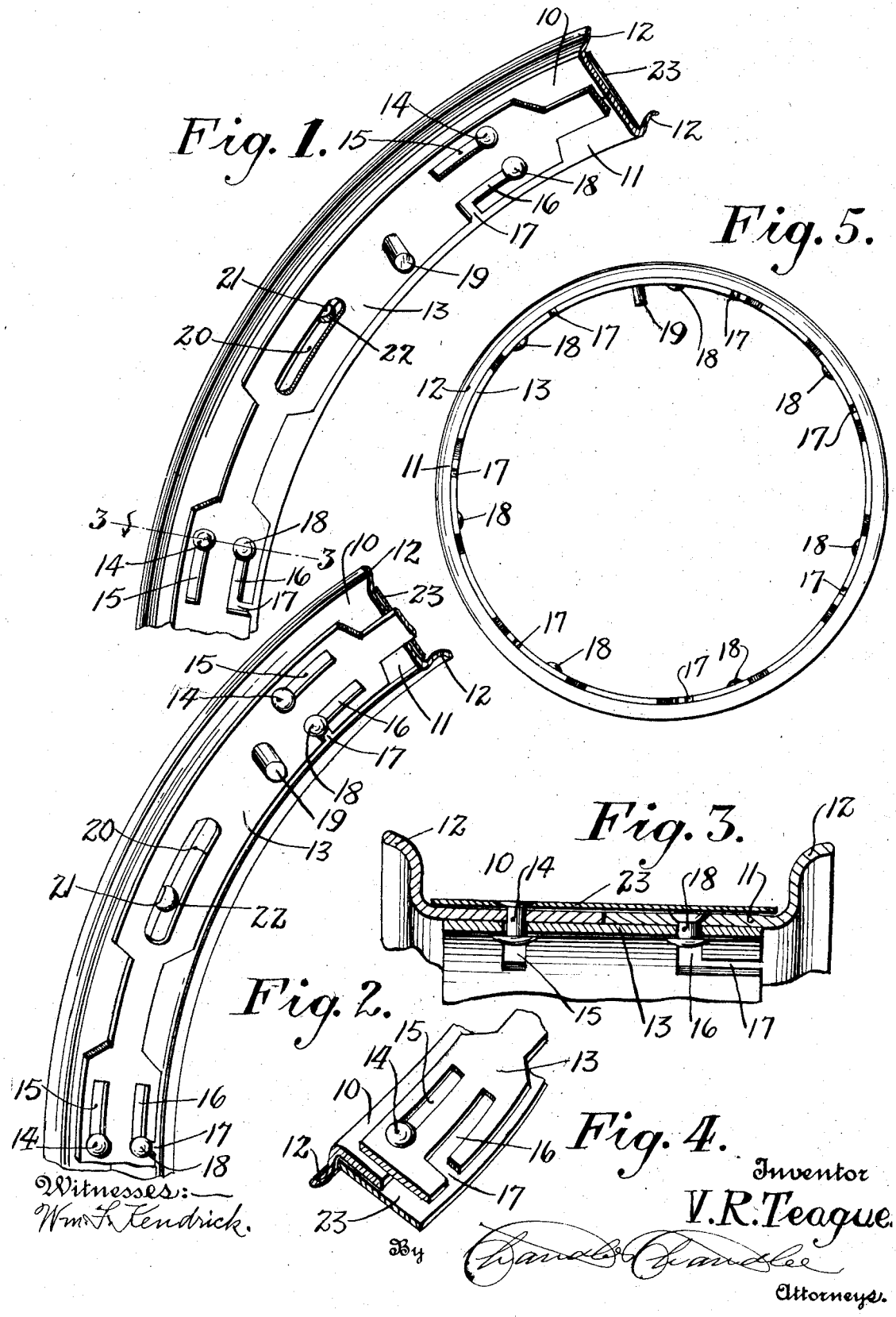

VICTOR R. TEAGUE, OF LOVINGTON, NEW MEXICO.

SEPARABLE TIRE-RIM.

1,345,282.  
Specification of Letters Patent. Patented June 29, 1920.

Application filed September 13, 1918. Serial No. 253,961.

*To all whom it may concern:*

Be it known that I, VICTOR R. TEAGUE, a citizen of the United States, residing at Lovington, in the county of Lea, State of New Mexico, have invented certain new and useful Improvements in Separable Tire-Rims; and I do hereby declare the following to be a full, clear, and exact description of the invention, such as will enable others skilled in the art to which it appertains to make and use the same.

The present invention relates to demountable rims for carrying the pneumatic tire of a vehicle wheel, and more particularly of that type wherein the rim is formed in separable sections whereby to permit attachment and detachment of the tire with respect thereto when said demountable rim has been removed from the fixed rim of the wheel.

It is in general the object of the invention to simplify and otherwise improve the structure and to increase the efficiency of devices of this character, and it is more particularly an object to provide a tire rim wherein its sections may be assembled or disassembled in a most ready and convenient manner to provide for attachment or detachment of the tire casing or shoe, provision being made for the valve stem of the air tube.

With the above and other objects and advantages in view, the invention resides more particularly in the novel combination, formation and arrangement of parts hereinafter described and particularly pointed out in the appended claims.

In the accompanying drawings:

Figure 1 is a perspective view of a portion of a demountable rim embodying the present invention, looking toward the inner periphery thereof.

Fig. 2 is a view similar to Fig. 1, but showing the locking band removed to releasing position.

Fig. 3 is a transverse sectional view on the line 3—3 of Fig. 1.

Fig. 4 is a perspective view of a fragmentary portion of one of the rim sections and the locking member carried thereby.

Fig. 5 is a side elevation of a rim embodying the present invention.

Referring now more particularly to the accompanying drawings, there is provided a demountable rim divided centrally to form a pair of sections 10 and 11 whose outer edge portions are out-turned at 12 to form the usual retaining flanges engageable with the bead portions of a tire casing, and the inner edges of the sections are disposed in abutting contact when assembled.

Disposed within the section 10 is a connecting band 13 which projects beyond the inner edge of the section 10 for engagement within the section 11 and which is secured to the section 10 in a manner permitting a limited degree of relative rotary movement by pins 14 projecting radially inward from the rim section 10 and slidable in circumferentially elongated slots 15 in the band, these slots being disposed in one side portion of the band. Disposed in the other side portion of the band are a series of slots 16 each of which has a lateral extension 17 at one end opening at the adjacent edge of the band, and these slots and their extensions are adapted to receive locking pins 18 projecting radially inward from the rim section 11. Thus upon insertion of the pins 18 through the extensions 17 into the adjacent ends of the slots 16, the rim sections may be securely locked together by relative rotation of the connecting band 13 and it is to be particularly noted that the locking and unlocking movement of the connecting band is procured independently of any relative movement of the rim sections 10 and 11. Rotative movement of the connecting band 13 is procured by means of a lug or boss 19 projecting radially inwardly therefrom and which may be struck up by any suitable tool. This lug will have to enter a hole or socket in the periphery of the wheel rim (not shown) and by preference near the usual valve stem opening therethrough, and in applying the demountable rim to the wheel this side of the rim is put on first, for a reason which will be clear. The rim is otherwise held on the wheel by means forming no part of the present invention.

The slots 15 and 16 are preferably arranged in transversely opposed pairs throughout the band, the number of pairs of slots varying in accordance with the size of the rim, and between two such pairs of slots 15 and 16, the band 13 is provided with a slot 20 for receiving the valve stem of the inner tube, which is received in mating notches 21 and 22 formed in the abutting edges of the sections 10 and 11.

To prevent pinching of the inner tube at the meeting edges of the rim sections, a shield band 23 is provided to cover the outer peripheries of the rim sections 10 and 11 between the flanges 12 thereof, this band being of a width equal to the distance between the flanges and being permanently secured to the rim section 10.

An exceedingly simple and strong demountable rim has thus been provided which may be disassembled to permit removal of a tire casing carried thereby without the necessity of relative rotation of its sections which engage the tire casing, and the consequent necessity of first prying the casing loose therefrom should the casing adhere to the bead flanges of the rim.

What is claimed is:

1. In a demountable rim, the combination with two sections abutting at their inner edges and having tire-engaging means along their outer edges, and a shield band secured around one section and overlapping the other; of a locking band within and movable circumferentially of said sections and having slots in pairs at intervals near its edges and one other slot for the valve stem, one slot of each pair having an extension opening out the edge of the band, pins in pairs in said sections for engagement with said pairs of slots, and an actuating lug on the inner side of this band near said valve stem-slot.

2. In a demountable rim, the combination with two sections abutting and oppositely notched at their inner edges and having tire-engaging means along their outer edges; of a locking band within and movable circumferentially of said sections and having slots in pairs at intervals near its edges and one other slot opposite said notches for the valve stem, one slot of each pair having an end extension opening out the edge of the band, pins in pairs in said sections for engagement with said pairs of slots, and an actuating lug on this band near said valve stem-slot.

In testimony whereof, I affix my signature, in the presence of two witnesses.

VICTOR R. TEAGUE.

Witnesses:
 ASA B. MORTON,
 D. W. PATTON.